US007796983B2

(12) United States Patent
Pao et al.

(10) Patent No.: US 7,796,983 B2
(45) Date of Patent: Sep. 14, 2010

(54) PHYSICS-BASED STATISTICAL MODEL AND SIMULATION METHOD OF RF PROPAGATION IN URBAN ENVIRONMENTS

(75) Inventors: Hsueh-Yuan Pao, San Jose, CA (US); Steven L. Dvorak, Tucson, AZ (US)

(73) Assignees: The Regents of the University of California, Oakland, CA (US); Lawrence Livermore National Security, LLC, Livermore, CA (US)

( * ) Notice: Subject to any disclaimer, the term of this patent is extended or adjusted under 35 U.S.C. 154(b) by 884 days.

(21) Appl. No.: 11/414,054

(22) Filed: Apr. 27, 2006

(65) Prior Publication Data

US 2010/0003991 A1 Jan. 7, 2010

Related U.S. Application Data

(60) Provisional application No. 60/675,566, filed on Apr. 27, 2005.

(51) Int. Cl.
*H04W 24/00* (2009.01)
(52) U.S. Cl. .................................. 455/423; 455/67.16
(58) Field of Classification Search ............... 455/404.1
See application file for complete search history.

(56) References Cited

U.S. PATENT DOCUMENTS

| 6,341,223 | B1 | 1/2002 | Park |
| 6,496,701 | B1 | 12/2002 | Chen et al. |
| 6,711,404 | B1 | 3/2004 | Arpee et al. |
| 6,782,257 | B1 | 8/2004 | Moustakas |
| 2007/0093213 | A1* | 4/2007 | Filizola et al. ........... 455/67.16 |

FOREIGN PATENT DOCUMENTS

| EP | 0903880 A2 | 3/1999 |
| WO | WO 98/04059 | 1/1998 |

OTHER PUBLICATIONS

Dudley D.G. et al "Systems Identification for Wireless Propagation Channels in Tunnels", HEEE Transactions on Antennas and Propagation, vol. XX, No. Y, 2004.

(Continued)

*Primary Examiner*—Charles N Appiah
*Assistant Examiner*—Joy K Contee
(74) *Attorney, Agent, or Firm*—James S. Tak

(57) ABSTRACT

A physics-based statistical model and simulation/modeling method and system of electromagnetic wave propagation (wireless communication) in urban environments. In particular, the model is a computationally efficient close-formed parametric model of RF propagation in an urban environment which is extracted from a physics-based statistical wireless channel simulation method and system. The simulation divides the complex urban environment into a network of interconnected urban canyon waveguides which can be analyzed individually; calculates spectral coefficients of modal fields in the waveguides excited by the propagation using a database of statistical impedance boundary conditions which incorporates the complexity of building walls in the propagation model; determines statistical parameters of the calculated modal fields; and determines a parametric propagation model based on the statistical parameters of the calculated modal fields from which predictions of communications capability may be made.

11 Claims, 8 Drawing Sheets

OTHER PUBLICATIONS

Dvorak, S.L. et al "A New solution for the Problem of Plane Wave diffraction by a 2-D Aperture in a Ground Plane", IEEE Transaction on Antennas and Propagation, vol. 53, No. 7 Jul. 2005.

Hsueh-Yuan Pao, "Probability-Density Function for Waves Propagating in a straight PEC Rough-Wall Tunnel." Microwave and Optical Technology Letters. vol. 44, No. Mar. 5, 2005. pp. 427-430.

* cited by examiner

PHYSICS-BASED STATISTICAL MODEL AND SIMULATION METHOD OF RF PROPAGATION IN URBAN ENVIRONMENTS

I. CLAIM OF PRIORITY IN PROVISIONAL APPLICATION

This application claims the benefit of U.S. provisional application No. 60/675,566 filed Apr. 27, 2005, entitled, "Physics-Based Statistical Models of RF Propagation in Urban Environments for Advanced Conflict Simulations" by Hsueh-Yuan Pao et al.

The United States Government has rights in this invention pursuant to Contract No. W-7405-ENG-48 between the United States Department of Energy and the University of California for the operation of Lawrence Livermore National Laboratory.

II. FIELD OF THE INVENTION

The present invention relates to electromagnetic wave propagation and communications, and more particularly to physics-based statistical and parametric models, simulation methods, and systems of RF propagation in urban environments.

III. BACKGROUND OF THE INVENTION

Urban environments are notorious for poor performance of wireless communications systems. This is because RF propagation between a transmitter and a receiver in an urban environment is often impaired by manmade structures, e.g. buildings and other structures comprising the environment. If there is no direct line of sight between the transmitter and receiver, which is often the case, the signal is propagated via multiple propagation paths through the network of space between the buildings, i.e. through streets, alleys, etc. due to reflections from the building walls. Since different building walls have different reflection and absorption coefficients, each multipath contribution will have a different phase and amplitude at the receiver. These multipath contributions add together either constructively or destructively to produce at the receiver a composite signal representing the aggregate of the multiple signals. However, since the electrical properties of building façades are complex and it is impossible to collect all necessary information to describe the building facades electrically, the composite signal at the receiver is often modeled statistically as a stochastic process. Furthermore, the received signal is not uniform over the cross-section of the street; the closer a receiver is to a building wall the more fluctuations the received signal will experience. And a still further complication is the mobile nature of the transmitter, receiver, or both in certain applications, such as for example cell phones or direct link transceivers, e.g. walkie-talkies. In this dynamic case, the path lengths and thus the RF signal phases will change as the transmitter, receiver or both move in the urban environment, thereby causing the signal level to fluctuate. This movement-dependent fluctuation can be quite rapid, which can cause the wireless communication link to be dropped.

Unfortunately, for either the dynamic case or fixed-position case, there are no computationally efficient parametric models that provide an accurate prediction of the received signal fluctuations in urban areas. Such signal fluctuations, together with the diverse and complex electrical properties of building walls, make RF propagation in an urban environment difficult to predict and model. In particular, it is difficult to accurately predict transmission/reception ranges as well as poor or no reception pockets/zones in an urban environment.

The need to effectively predict and model RF propagation in an urban environment is important for both military and commercial applications. In the military case, a military commander and/or ground troops must see, understand, and interact with the urban battlespace in real time, and both receive and feed tactical data between the individual warfighter, the command post, and from local or remote sensors in the urban environment. As such, radio communications effectiveness must be predictable in urban tactical environments to maximize situational awareness of participants and optimize communications asset locations (e.g. repeater emplacement). As military operations continue to take place with greater frequency in urban areas as compared to large-scale field operations, a greater dependency is placed on the availability of effective local radio communications, as well as the quick deployment of such communications systems. Currently, however, predictions cannot be made as to where wireless communications systems can be successfully employed and where they will fail due to interference caused by buildings and structures. Similarly, commercial wireless communications systems planners cannot at the present time predict and model wireless communications ranges/reception zones in urban environments to facilitate the planning and pre-engineering of new locations for cell phone towers or repeaters without extensive experimentation.

Current techniques for modeling RF propagation are based on either empirical measurements or ray-tracing. Empirical methods, for example, are based solely on extensive measurements made in generic settings at different sites, and are therefore dependent on the site locations, the measurement methods, measurement frequencies, etc. In particular, the signal strength is measured at a number of different locations and at different heights, with different empirical models used for different generic propagation problems, e.g. for rural, suburban, and urban propagation environments. However, there is little consideration of the details of the propagation environment, e.g. actual building and street locations and configurations. Therefore, while empirical methods can predict order-of-magnitude average propagation loss, they cannot predict fine details about the propagation channel like dead zones and multipath interference. Moreover, empirical methods base their statistics on experiments without sufficient underlying theory to enable generalization to environments other than those in which the experiments were conducted.

Ray-tracing is a deterministic method based on geometrical optics and the uniform theory of diffraction (UTD), and can be used to calculate propagation mechanisms such as the direct (LOS), reflected, transmitted, diffracted, and some combined rays. The ray-tracing method is not based on extensive measurements, but rather relies on site-specific information such as actual geometric and structural information of the building, e.g. the façade structure and geometry. FIG. 1 shows an illustration of ray tracing in an urban environment indicated at reference character 100 and comprising buildings such as 105. The basic procedure of the ray-tracing method is the shooting-and-bouncing ray (SBR) algorithm involving three basic processes, with the first process launching a ray. FIG. 1 shows the propagation paths of three rays 102, 103, and 104 launched from a transmission location 101. The second process is determining if the ray hits an object in what is known as the ray-object intersection test. And the third is determining whether a ray is received at a receiver location 106.

Of these three steps, arguably the most important procedure is the ray-object intersection test which affects the accuracy for ray paths from the transmitter to the receiver and thus also the accuracy of the field prediction. When the building surfaces are flat and smooth and the geometric and electrical parameters are known, the ray-tracing algorithm can provide results with good accuracy compared with empirical measurements. However, because ray tracing is a high frequency approximation of the full-wave solution it is not applicable if the building has (electrically) small structures. Therefore, the ray-object intersection test does not incorporate the complex nature of the building walls, which can consequently produce inaccurate results. Furthermore, this intersection test procedure is based on mathematical physics alone, making them unwieldy and computationally burdensome i.e. consuming more than 90% of the ray-tracing simulation. Although many accelerating algorithms have been developed, this computational burden is considered to make the ray tracing method still too slow and unsuitable for use in restrictive real-time situations.

Thus there is a need to go beyond over-simplified empirical models of RF propagation in urban environments as well as computationally burdensome methods such as ray tracing. What is needed still is a solution which enables the real time, accurate, and non-computationally intensive modeling, analysis, and prediction of local wireless communications capability in urban environments.

IV. SUMMARY OF THE INVENTION

One aspect of the present invention includes a method of modeling electromagnetic wave propagation in an urban environment comprising a plurality of buildings and a spatial network therebetween, said method comprising: dividing the spatial network of the urban environment into a plurality of urban canyon waveguides clad by said buildings and interconnected to each other at intersections defined by waveguide apertures; propagating an electromagnetic wave through the urban environment to calculate spectral coefficients of modal fields in the waveguides excited by the propagation, wherein the calculation uses a database of statistical impedance boundary conditions; determining statistical parameters of the calculated modal fields; and determining a parametric propagation model based on the statistical parameters of the calculated modal fields.

Another aspect of the present invention includes a method of determining communications capability in an urban environment comprising a plurality of buildings and a spatial network therebetween, said method comprising: receiving transmission parameters as input; and determining communications capability in different zones of the urban environment based on the transmission parameters and a parametric propagation model developed using statistical parameters of modal fields calculated in a physics-based propagation simulation through the urban environment.

Another aspect of the present invention includes a method of determining communications capability in an urban environment comprising a plurality of buildings and a spatial network therebetween, said method comprising: receiving transmission parameters as input; simulating propagation of an electromagnetic wave through the urban environment based on said transmission parameters to calculate spectral coefficients of modal fields in the waveguides excited by the propagation, wherein the calculation uses a database of statistical impedance boundary conditions of building walls; determining statistical parameters of the calculated modal fields; determining a parametric propagation model based on the statistical parameters of the calculated modal fields; and determining communications capability in different zones of the urban environment based on the transmission parameters and the parametric propagation model.

Generally, the present invention is directed to a physics-based statistical model and simulation/modeling method of electromagnetic wave propagation in urban environments, as well as a prediction tool of electromagnetic propagation and wireless communications capability and effectiveness in such environments, i.e. where communications will succeed and where they will fail. In particular, the propagation model is preferably a computationally efficient close-formed parametric model of RF propagation in an urban environment which is extracted from the physics-based statistical wireless channel simulation method comprising the following general steps: dividing the complex urban environment into a plurality of urban canyon waveguides interconnected to each other at intersections; propagating a signal in these unit waveguides to calculate modal fields of each waveguide in an iterative branching progression; and then using statistical parameters to produce a simple parametric model of the multi-path propagation in the urban environment from which communications predictions can be made.

The propagation model and simulation method of the present invention incorporates the complexities of building walls by using a database of the statistical impedance boundary conditions of the urban canyons to calculate the modal field solutions analytically (i.e. solve the boundary value problems) and obtain close-formed solutions accurately. In particular, the database provides the statistical impedance boundary conditions of different categories of building walls derived from empirical measurements taken of various building facade parameters, such as from representative cities. As such, the statistical method of the present invention provides a more realistic simulation of the electromagnetic signal propagation in urban environments than for example empirical models which are too rough to take into account details of the environment such as building and street features.

Furthermore, the use of such statistical parameters enables the present invention to model stochastic processes such as is characteristic of urban environment propagation, rather than strictly deterministic processes such as in the ray tracing method. Modeling the stochastic problem of urban environment propagation is often problematic for deterministic methods due to the lack of detailed information available about the actual features and structures (e.g. scattering surfaces) in a real-world urban propagation channel, i.e. channel parameters are typically given with uncertainties or are not always available. When there are smooth or otherwise well-defined boundaries, large constructive and destructive interference is produced, thereby producing deep nulls. However, for very complex scattering problems or diffuse scattering problems (such as at rough and poorly defined surfaces), there exists a smoothing of the interference phenomenon and a filling in of the deep nulls that are characteristic of well-defined diffraction and specular reflection problems. This means that the statistical approach of the present invention requires less detailed information (e.g. of geometrical and electrical parameters of the building surfaces) to accurately model the stochastic process of urban environment propagation. In particular, the dominant effects of the unknown or imprecisely determined scattering objects are incorporated in moments of the probability density function without requiring detailed, accurate knowledge of the scattering objects. This lessened requirement can also substantially reduce the cost of accurate building information extraction and accelerate the entire simulation cycle.

It is notable that a key benefit of the database and the pre-processed statistical impedance boundary condition information provided thereby is its ready-to-use availability for calculating the modal fields, which contributes to reduce computation requirements in the propagation simulation and quickly generate the close-formed parametric model. In addition, because the close-formed parametric model is itself also computationally efficient, the complete process of simulating propagation and then implementing the close-formed parametric model to predict wireless communications capability, may be performed in real time to enable fast predictions and deployment of wireless communications systems in urban environments.

As such the simple parametric model of the present invention may be used, for example, in military or law enforcement applications such as: actual combat situations to enable soldiers/police officers to make real time determinations of optimal transmission/reception zones, military planning systems, military communication systems, multi-entity urban conflict computer simulation and training, etc. Planning and execution of tactical military operations in urban terrain in particular may be facilitated by the present invention by enabling planners to visualize and accurately predict the effect of the urban environment on communications channels (such as C2I channels) and on ground units that depend on these channels for tactical situational awareness. For example, the model can be used to provide pre-execution simulation and analysis of the communications environment in a particular area as part of mission/campaign planning, as well as enable opportunities for simulated training and rehearsal.

Additionally, the present invention may also be utilized for the engineering of commercial wireless communications systems, sensor networks, remote sensing, RF ranging, etc. in complex urban environments. For example, cell phone companies can use the results obtained from the models to deploy wireless communications systems rapidly and efficiently by pre-planning rather than the current used high-cost time-consuming mapping measurement methods. Similarly, the propagation model of the present invention may also be used, for example, by home/business security companies to implement wireless security monitoring networks.

V. BRIEF DESCRIPTION OF THE DRAWINGS

The accompanying drawings, which are incorporated into and form a part of the disclosure, are as follows.

VI. DETAILED DESCRIPTION

Figure 1:
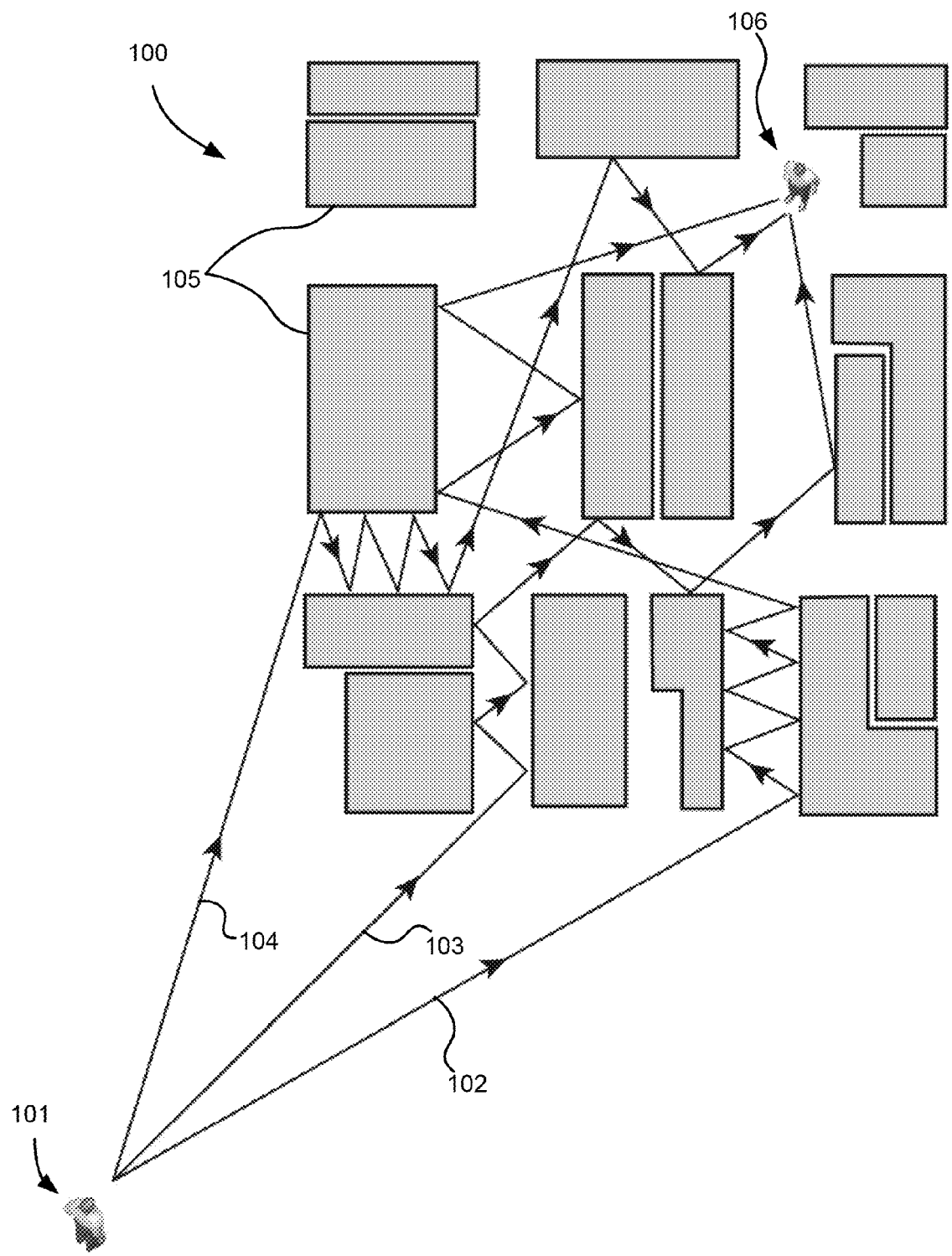
FIG. 1 is an plan view of an urban environment illustrating propagation modeling using the ray tracing method known in the prior art.
Figure 2:
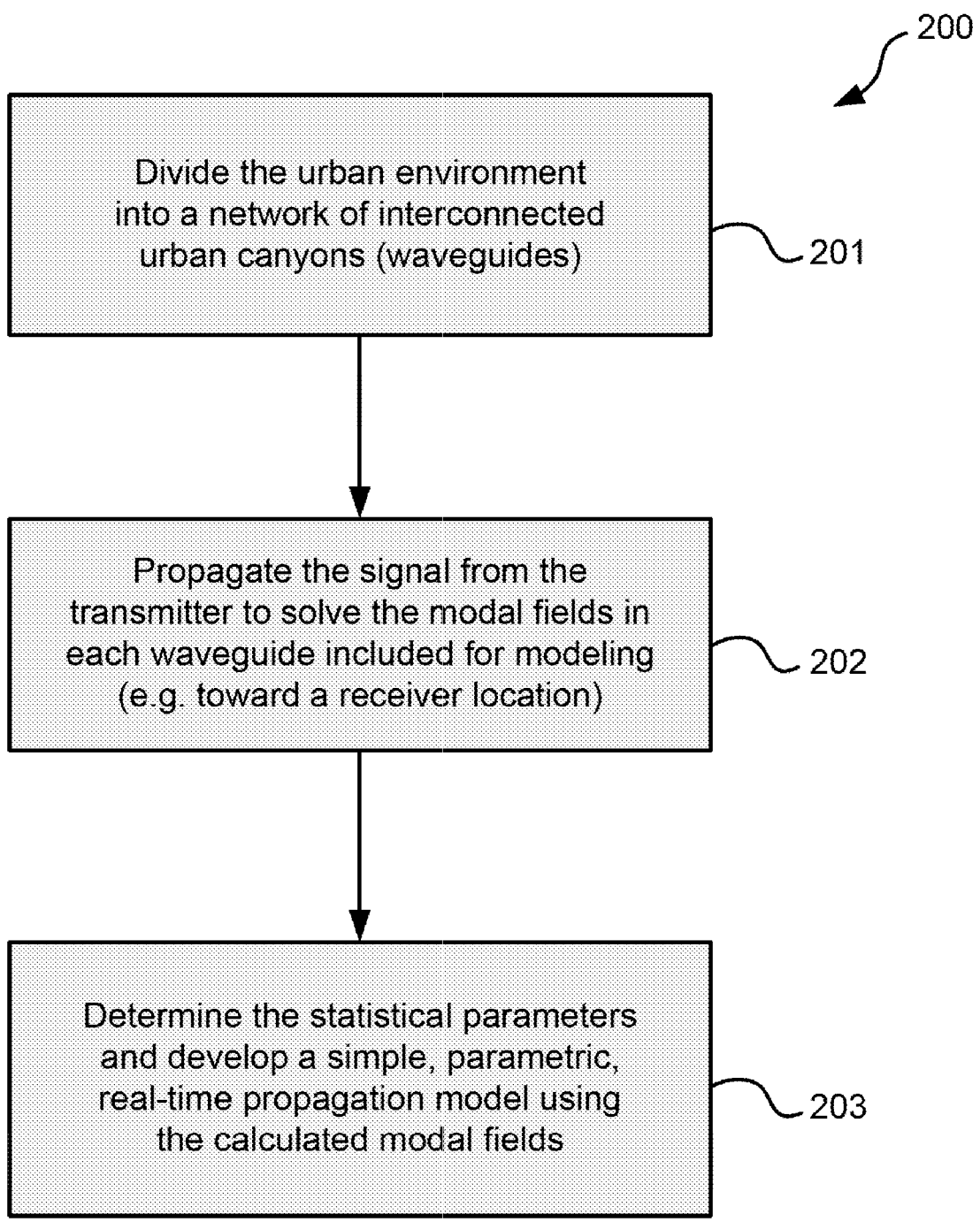
FIG. 2 is a schematic flow diagram of an exemplary overview method of the present invention for developing a simple parametric model of urban environment propagation.

Turning now to the drawings, FIG. 2 shows a schematic flow diagram of an exemplary overview method of the present invention generally indicated at reference character 200, for modeling/simulating electromagnetic wave propagation (preferably RF propagation) in an urban environment, and generating a parametric propagation model from the simulation. The flowchart is shown having three general steps shown at blocks 201-203. At block 201, the large complex urban environment is first divided or otherwise re-characterized into a network of interconnected urban canyon waveguides which are capable of being individually analyzed. At block 202, a signal is propagated (i.e. simulated propagation) from a transmitter through the network of interconnected waveguides (and preferably toward a receiver location) to calculate the modal field solutions in each waveguide that is included for modeling. In particular the propagation simulation is performed in the unit waveguides individually, with the modal field solutions calculated for one waveguide used to solve the modal fields for an adjacent waveguide or waveguides connected at an intersection, in an iterative branching progression. It is appreciated that "modal field" is the complete set of solutions which satisfy the partial differential equation, i.e. the wave equation. And at block 203, statistical parameters, such as expected value, variance, auto-correlation, covariance, different moments, etc. are then used to produce a parametric model of the multi-path propagation in the urban environment. The simple parametric model may be implemented as, for example, a lookup table from which predictions of wireless communication capability may be made for various coordinate regions within an urban environment. Another example would be to produce a graphic display that is generated based on the parametric model and showing different zones of wireless communications capability. The following discussion will describe in greater detail each of these general steps.

In order to simplify the present discussion, the modeling problem is described in the context of a two-dimensional (2-D) problem, i.e., the geometry of the urban propagation problem is independent of the vertical z variable. This corresponds to the case where the buildings in the urban environment are infinitely tall, a semi-infinite magnetic line source is used as the transmitter (Tx), and a flat perfectly conducting surface is used to model the Earth's surface. After image theory is applied to the Earth's surface, then this problem reduces to the simplified 2-D case. However, once the 2-D problem is solved, as described below, the solution is extended to a three-dimensional problem (3-D) by employing an additional Fourier transform in the z direction, as known in the art. This allows for the modeling of finite height buildings, finite size transmitter antennas, and the use of surface impedance boundary conditions to model the Earth's surface.

A. Dividing the Urban Environment into Network of Interconnected Urban Canyon Waveguides The complex urban environment may be characterized as comprising a plurality of structures, i.e. buildings, and a spatial network between the structures, i.e. streets, alleys, etc. through which electromagnetic waves propagate. Modeling this complex environment is difficult because of the electrical size (feature size relative to the RF wavelengths) and complexity (numbers of reflective surfaces with various electrical characteristics) of the environment. In order to reduce and deal with this complexity, the urban environment is first divided into smaller simpler unit blocks which are capable of being individually modeled and analyzed. In particular, the complex urban environment is divided into or otherwise re-characterized as a plurality of urban canyon waveguides which are formed between and cladded by buildings, and interconnected to each other at intersections. As waveguides, each urban canyon waveguide is preferably further characterized as having similar electrical walls and a uniform width, i.e. modeled as a parallel-plate waveguide. These walls are represented by equivalent statistical impedance boundary conditions, as will be discussed in greater detail below. And the urban canyon waveguides have apertures at both ends which, together with other apertures of adjacent waveguides, outline and form the intersections between the waveguides.

The term "urban canyon waveguide" is used herein and in the claims to describe a waveguide formed between and clad by building walls on opposite sides of a street, alley, or other section of the spatial network. However, the terms "urban propagation channel," "urban canyon," and "waveguide," are considered term equivalents with "urban canyon waveguide" and as such are used interchangeably with "urban canyon waveguide" herein and in the claims. Furthermore, it is appreciated that the dividing step can be either a conceptual re-characterization of the problem, or implemented as an executable process step when street and building location data of an urban environment is available. For example, data representing the entire urban environment may be processed to extract, parse, flag, or otherwise separately identify each urban canyon from all others.

Figure 3:
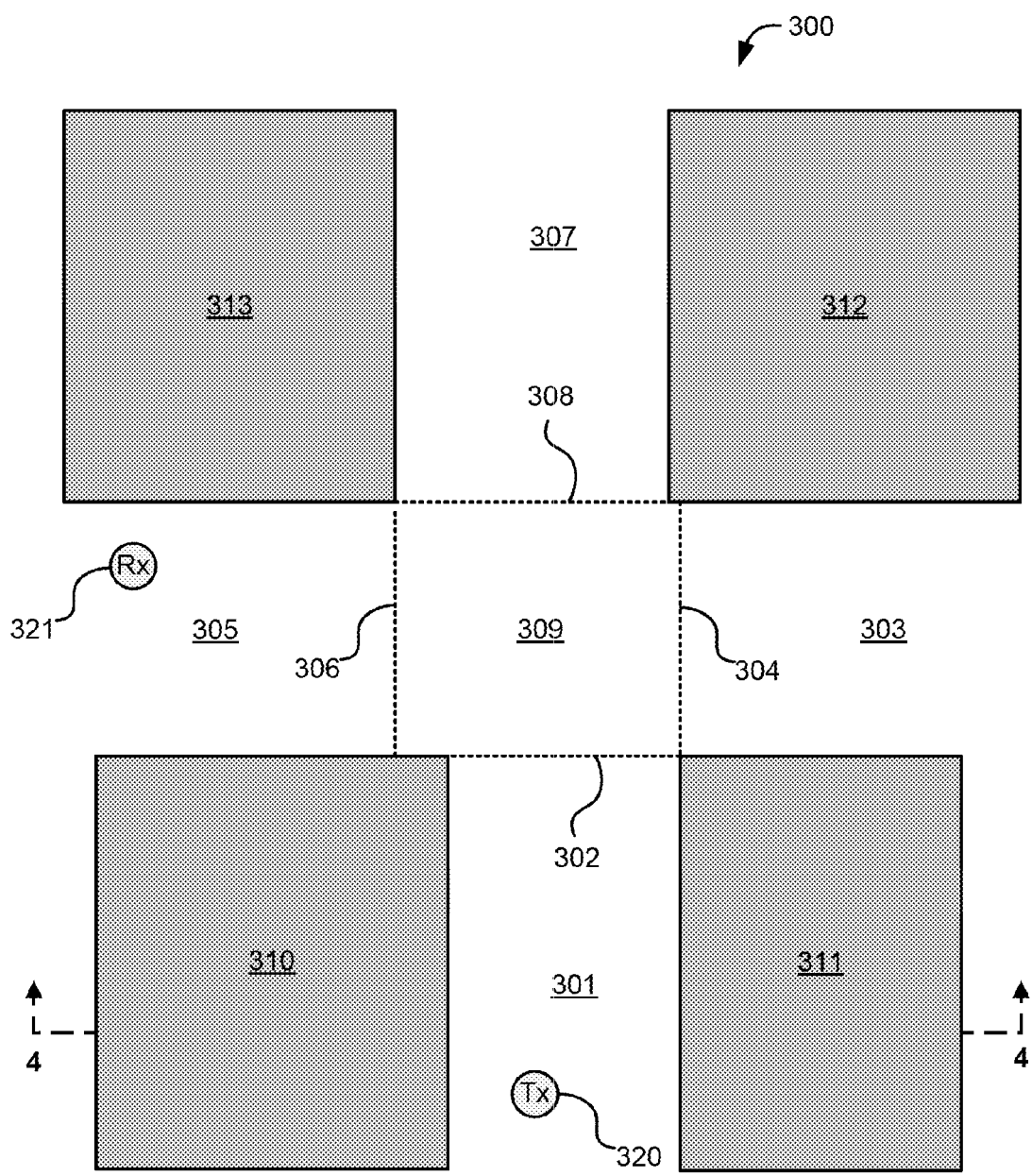
FIG. 3 is a plan view of an intersection in an urban environment illustrating the present invention's characterization of the urban environment as a plurality of interconnected urban canyons or waveguides.

FIG. 3 shows a plan view of an exemplary intersection in an urban environment 300 illustrating the present invention's characterization of the urban environment as a plurality of interconnected urban canyon waveguides. In particular, the street section between building 310 and building 311 is characterized as a first urban canyon waveguide 301, the street section between building 311 and building 312 is characterized as a second urban canyon waveguide 303, the street section between building 310 and building 313 is characterized as a third urban canyon waveguide 305, and the street section between building 312 and building 313 is characterized as a fourth urban canyon waveguide 307. In FIG. 3, each of the four urban canyon waveguide is shown modeled as a parallel-plate waveguide. And the four waveguides are considered adjacent and connected to each other at intersection 309, with the waveguide apertures 302, 304, 306, and 308 of waveguides 301, 303, 305, and 307, respectively, outlining and forming the intersection 309.

B. Develop a Database of Statistical Impedance Boundary Conditions to Characterize the Urban Canyon Waveguide As discussed in the Background section, because the nature of the environment surrounding the transmitters and receivers affects signal propagation, various aspects of the environment in which the communication system is to function must first be described/characterized in terms of their material properties, geometrical locations, sizes and shapes, etc. Therefore and in order to analyze modal fields and predict RF propagation accurately and efficiently, the present invention incorporates the complexities of building walls into the electromagnetic propagation model. It does so by using a database of statistical models of impedance boundary conditions (which is used to calculate modal field solutions) representing different categories of building wall surfaces. The impedance boundary conditions of the urban canyon waveguide are statistically extracted from empirical measurements of building facade parameters and/or numerical simulations. In either case, a large number realizations must be made on different types of buildings in order to construct the statistical boundary conditions for a building this database. The database of statistical impedance boundary conditions is preferably developed and generated well in advance of propagation simulation, according to the following steps.

First, a set of building categories is developed based on parameters such as angle of incidence, building materials, surface roughness, number of exterior doors and windows, the sizes and placement of the windows, types of decorative masonry, etc. As previously discussed, this can be accomplished either by experimental measurements, i.e. conducting a survey of different urban building facades in exemplary cities to determine characteristic structural parameters, or by using numerical modeling techniques.

Figure 4:
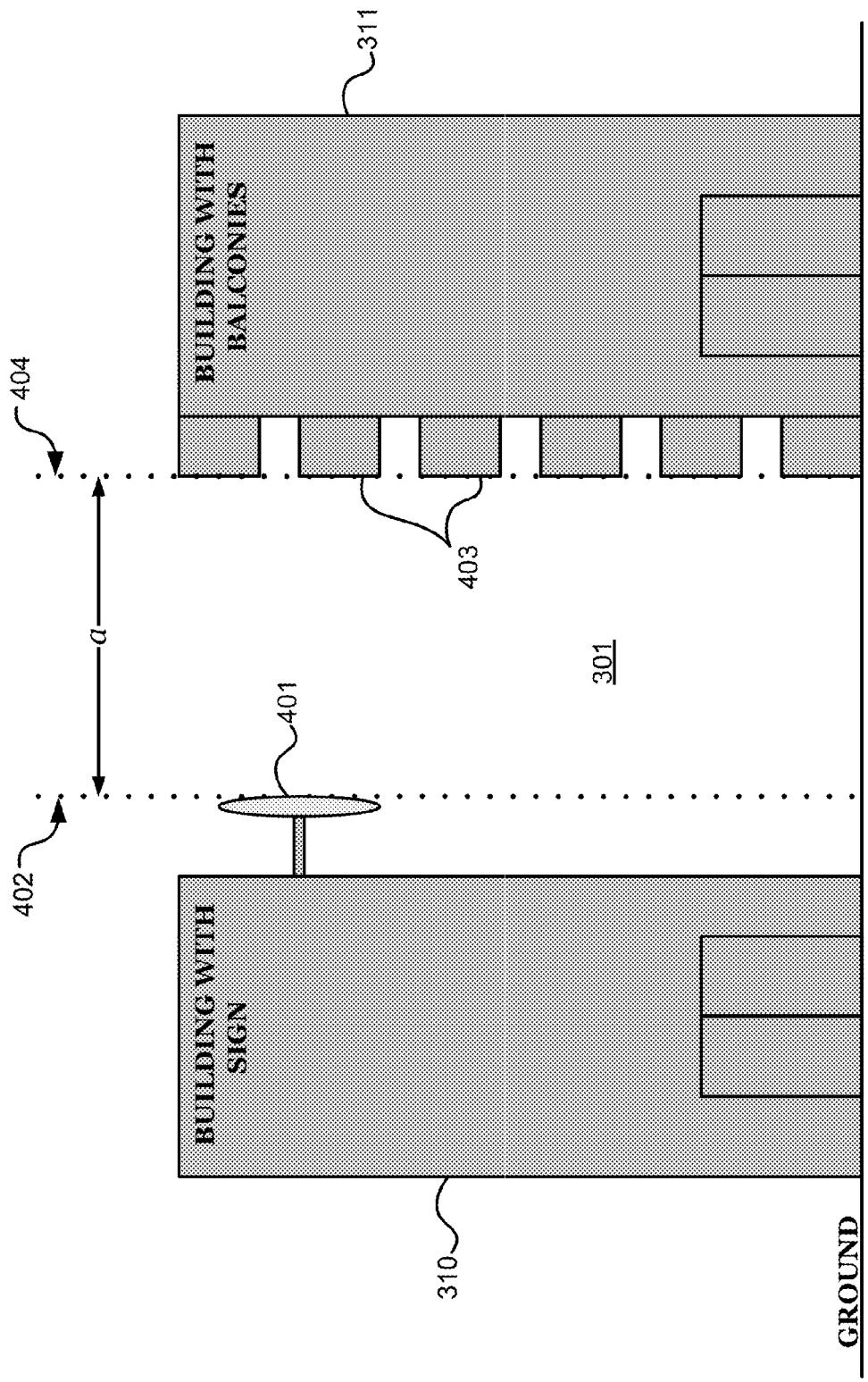
FIG. 4 is a cross-sectional view taken along line 4-4 in FIG. 3 and showing an illustrative urban canyon of the present invention and the statistical boundary condition characterization of its building walls.

Equivalent reference planes are then determined on both sides of the street adjacent the buildings cladding the urban canyon waveguide. The equivalent reference planes must be close to the buildings, but not intersect any of the building facade features. And the equivalent street width that is used for the waveguide model is defined as the distance between the equivalent reference planes. In FIG. 4, for example, urban canyon waveguide 301 is shown clad by building 310 having a sign 401, and building 312 having balconies such as 403. The equivalent reference planes in FIG. 4 are presented at 402 and 404, where plane 402 is just beyond the sign 401 and plane 403 is just beyond the balconies 403. And the equivalent street width is shown as "a".

The equivalent impedance boundary conditions at the reference planes are then determined. The equivalent surface impedance is constructed by taking the ratio of the tangential electric and tangential magnetic fields at the boundaries. The required fields are determined by numerical calculations or experimental measurements.

And finally, the statistical boundary conditions are developed for the different building categories, using for example statistical methods like Monte Carlo techniques. Based on extensive calculations or measurements, the statistical impedance boundary condition database is produced that can be conveniently accessed for the modal field calculations. The mean, variance, and the power spectral density are utilized to describe the boundary conditions. In addition to the previously described parameters, the angle of incidence is also preferably used as a parameter in the database development.

It is notable that since this database is preferably generated ahead of time before performing propagation simulation, pattern recognition techniques may be used in a preferred embodiment to identify the appropriate statistical boundary conditions to use from the database in order to provide seamless modeling during simulations.

C. Signal Propagation Through the Network of Interconnected Urban Canyon Waveguides to Calculate Modal Fields Generally, after dividing the complex urban environment into the plurality of interconnected urban canyon waveguides, multipath propagation through the waveguides is modeled by calculating the modal fields for all the urban canyon waveguides included for modeling, and more particularly by determining the spectral coefficients for the modal fields excited by the Tx antenna. In particular, the spectral coefficients for a waveguide are determined by using the database of statistical impedance boundary conditions, together with transmission parameters such as transmission location, transmission power, transmission environment (e.g. street/building information such as from a map), etc, which are preferably provided as input.

As previously discussed, use of the statistical database serves to factor in the equivalent statistical impedance boundary conditions modeled for the walls of the buildings, i.e. at the reference planes near the building facades. And it is notable that the modeling problem is formulated in the spectral domain, i.e., the Fourier transform domain in order to handle these surface impedance boundary conditions that vary with spatial position and/or angle of incidence. This allows for the modeling of rough surfaces, which can lead to diffuse scattering about the specular scattering direction. After applying a spatial Fourier transform to the Helmholtz equation known in the art which results from the application of Maxwell's equations, the boundary conditions are enforced at the two reference planes (i.e. the waveguide's surface impedance walls) and at the source plane. In this manner, spectral domain representations are formulated for the electric and magnetic fields within an infinitely long urban canyon waveguide, i.e. the spectral coefficients are determined for the eigenfunctions of the spectral domain representations representing the fields excited by the transmission signal. The details of these calculations are found in a publication by Applicants entitled, "Probability Density Function for Waves Propagating in a Straight PEC Rough Wall Tunnel" which details statistical modeling of a rough cave surface, and incorporated by reference herein in its entirety.

Generally, because urban propagation may be characterized as a combination of straight propagation down an urban canyon waveguide, and transition to other adjacent waveguides at intersections, the process for determining the spectral coefficients for all considered waveguides is performed in an iterative branching progression where the calculated modal fields solutions produced from one waveguide are used for subsequent modal field calculations in an adjacent waveguide or waveguides connected at an intersection. In particular, the present invention models the transition propagation between adjacent waveguides connected at an intersection by using the radiated field calculation at an exit aperture of a first waveguide as an approximation of the modal field calculation at an input aperture of a second adjacent waveguide. By modeling these principal apertures as 2-D the modal fields in these principal apertures may be approximated and used as equivalent sources to find the modal fields in the adjacent waveguides. This is accomplished by using a Kirchoff formulation for the aperture radiation problem, as described in publication by Applicants entitled, "A New Solution for the Problem of Plane Wave Diffraction by a 2-D Aperture in a Ground Plane," (*IEEE Trans. Antennas Propagat.*, Vol. 53, No. 7, pp. 2299-2306, 2005), which details wave diffraction and propagation from a 2-D aperture, and incorporated by reference herein in its entirety. Since the desired modal representation has already been obtained for the aperture fields, the close-formed aperture radiation results that are described in this publication may be used to efficiently calculate the fields that are radiated from the aperture.

This simulation process is repeated for additional waveguides until all waveguides included for modeling are considered. The criteria for continuing or ending simulations for additional waveguides (i.e. whether to include a particular waveguide in the modeling/simulation) is preferably based on whether a predetermined end condition is met. End conditions may include, for example, upon locating a receiver; reaching a maximum range from a transmission point, where the max range is set by user or determined based on modal field calculations indicating insufficient signal power, insurmountable attenuation, etc. In the case of locating receiver as the end condition, the field solution process is repeated in a "marching procedure" again and again until the fields at the receiver location are found.

To generally illustrate this modeling step of calculating the modal fields, FIG. 3 is used to describe a hypothetical transmission from a transmitter Tx to a receiver Rx, both located in the urban environment 300. In particular, the transmitter Tx is indicated at 320 and is located in urban canyon waveguide 301. And the receiver Rx is indicated at 321 and located in urban canyon waveguide 305. In this case, waveguide 301 and waveguide 305 are adjacent waveguides connected to each other at intersection 309 via respective waveguide apertures 302 and 306. Furthermore, waveguide 301 is considered the first-order urban canyon waveguide since the transmitter 320 is found therein, and the three adjacent waveguides 303, 305 and 307 are each considered second-order urban canyon waveguides, i.e. at a second level. As used herein and in the claims, the level or order of a waveguide (and level or order of propagation simulation) is one plus the degree of separation from the first-order waveguide. Thus, in the present example, waveguides 303, 305 and 307 are each once removed from the first-order waveguide 301, and are therefore all considered second-order waveguides, i.e. at level 2.

Figure 7:
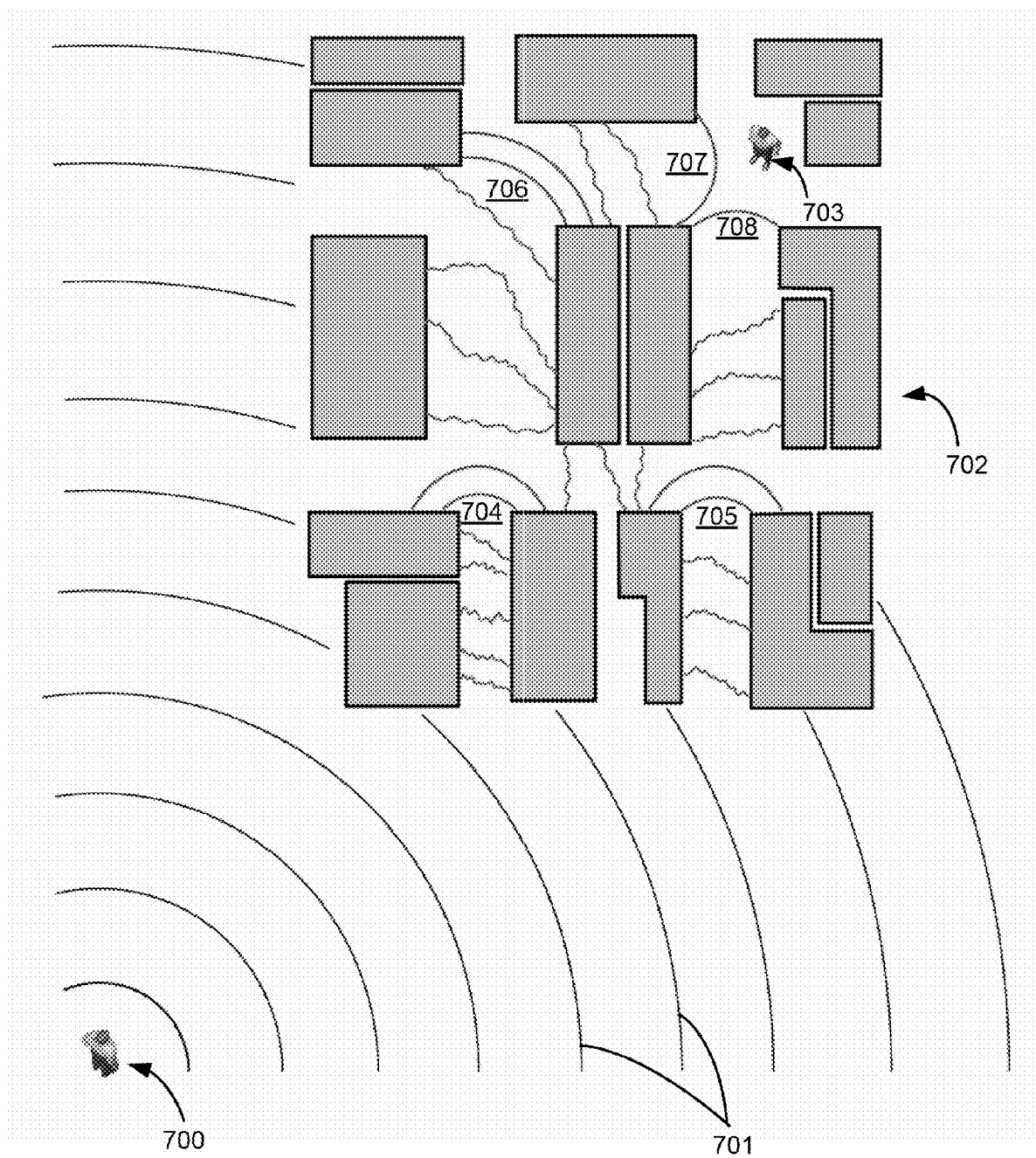
FIG. 7 is a plan view of an urban environment illustrating the propagation modeling and simulation of the present invention, for predicting the wireless communications capability in the urban environment.

It is appreciated that because a transmission location may originate from within or outside an urban environment, proper characterization of the propagation directional as well as a first-order urban canyon waveguide characterization should also be considered in the modeling procedure. In the case of a transmitter located within the urban environment, such as transmitter 320 in FIG. 3, the particular waveguide where the transmitter is located would be characterized as the first order waveguide, e.g. waveguide 301. Propagation in this case would be in the direction of both aperture ends of the waveguide. In FIG. 3, for example the propagation from transmitter 320 would be both toward aperture 302 and also in the opposite direction. In the case of transmitter located outside the urban environment, such as shown in FIG. 7, but transmitting into the urban environment, one or more urban canyon waveguides may be characterized as first-order waveguides through which signal propagation is in one direction. As shown in FIG. 7, a propagated signal 701 is originated from a transmission location 700 and sent to a receiver 703 located in an urban environment 702. Radiation fields are shown at 704-708 generally illustrating the propagation through the transitions at the intersections.

Figure 5:
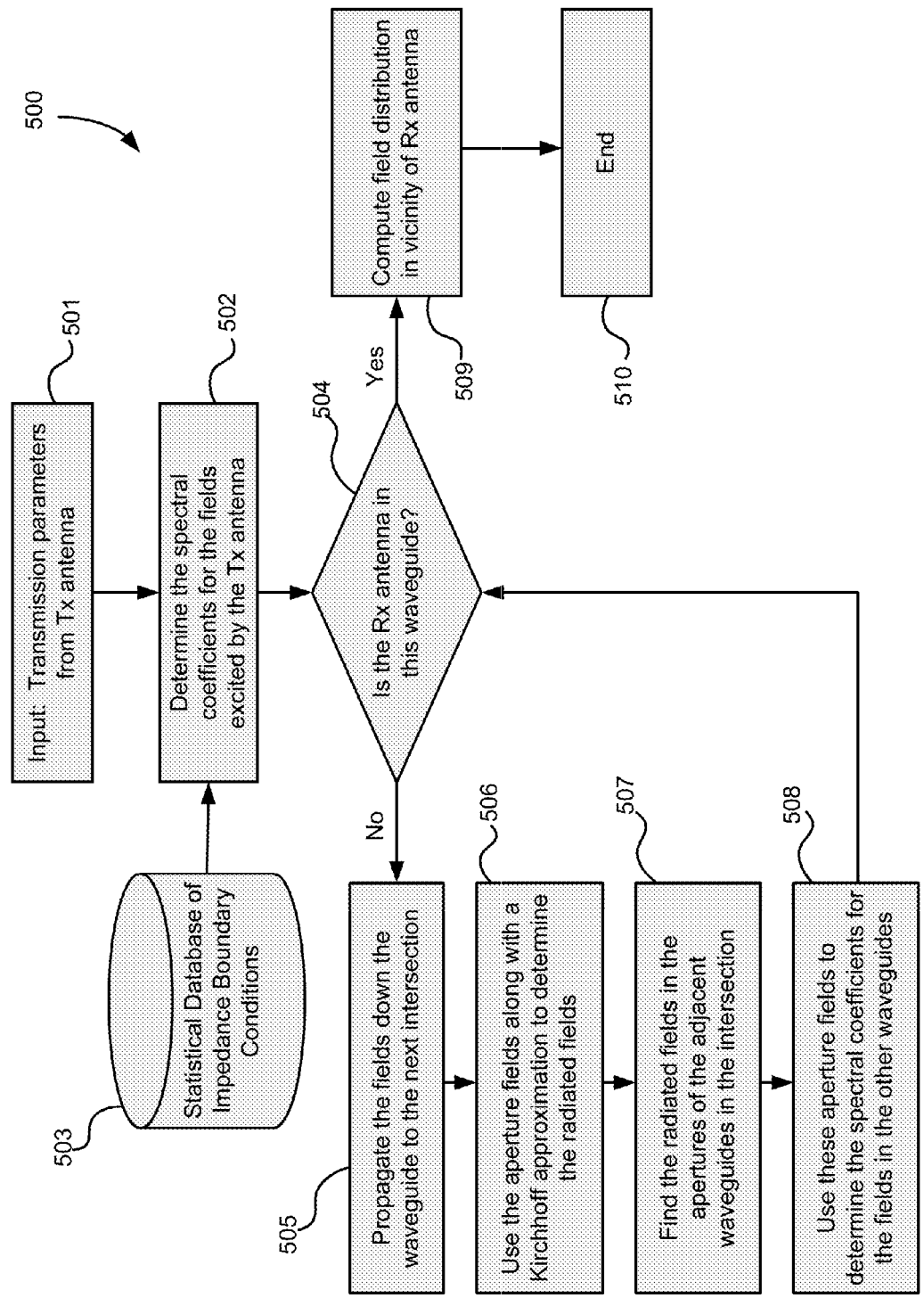
FIG. 5 is a schematic flow diagram of an exemplary simulation method of the present invention where a transmission signal is propagated through a series of urban canyons until received at a receiver.

D. 1$^{st}$ Exemplary Embodiment of Signal Propagation Modeling Through the Network of Interconnected Urban Canyons to FIG. 5 is a schematic flow diagram of an exemplary simulation method of the present invention, generally indicated at reference character 500, where a transmission signal is propagated through a series of urban canyon waveguides until received at a receiver located in the urban environment. As such, FIG. 5 is an exemplary simulation method described by block 202 in FIG. 2 for calculating the modal fields in the propagation. As shown at block 501, transmission parameters from transmitter antenna (Tx), is received as input. As previously discussed these transmission parameters may include transmission location, power, building/street configuration information, i.e. map, etc. And block 503 shows the statistical database of impedance boundary conditions. At block 502, the transmission parameters from 501 and statistical impedance boundary conditions from the database 503 are used to determine the spectral coefficients for the fields excited by the Tx antenna. In particular, the transmission signal is propagated (i.e. propagation simulation) from the transmitter to the receiver, to find the modal-field solution for all waveguides serially connected and leading from the transmitter to the receiver. At block 504, a determination is made as to whether the receiver (Rx) antenna is in the current waveguide.

If the answer to block 504 is no, the simulation proceeds into adjacent waveguides as discussed above. In particular, at block 505 the fields are propagated down the waveguide to the next intersection and the spectral representations for the fields in the current waveguide are used to compute the fields at its output aperture, i.e., the aperture plane where the buildings end because of a crossing street or an alley between the buildings. Since the waveguide is a closed structure, various mathematical means known in the art may be employed to analytically evaluate the inverse Fourier transform to find the fields. At block 506, the propagated fields are used along with Kirchhoff's approximation to determine the radiated fields, as previously discussed. At block 507, the radiated fields in the other apertures of the adjacent waveguides in the intersection are found. The previously discussed close-formed aperture radiation results are used to find the modal-fields in the input apertures for the adjacent waveguides in the intersection. Then at block 508, these radiated aperture fields are used to determine the spectral coefficients for the fields in the other waveguides. Once the input fields have been found for the adjacent waveguides in the intersection, then they can be used to solve for the spectral coefficients for the spectral-domain representations for the fields in these waveguides. These spectral-domain field representations are again used to propagate the fields down the waveguides until the fields either reach the Rx antenna or another junction/intersection, as determined at block 504.

If the Rx antenna is found, the fields are propagated down the waveguide to the Rx antenna and the field distribution is computed in the vicinity of the receiver, at block 509, and the simulation is finished at 510.

Figure 6:
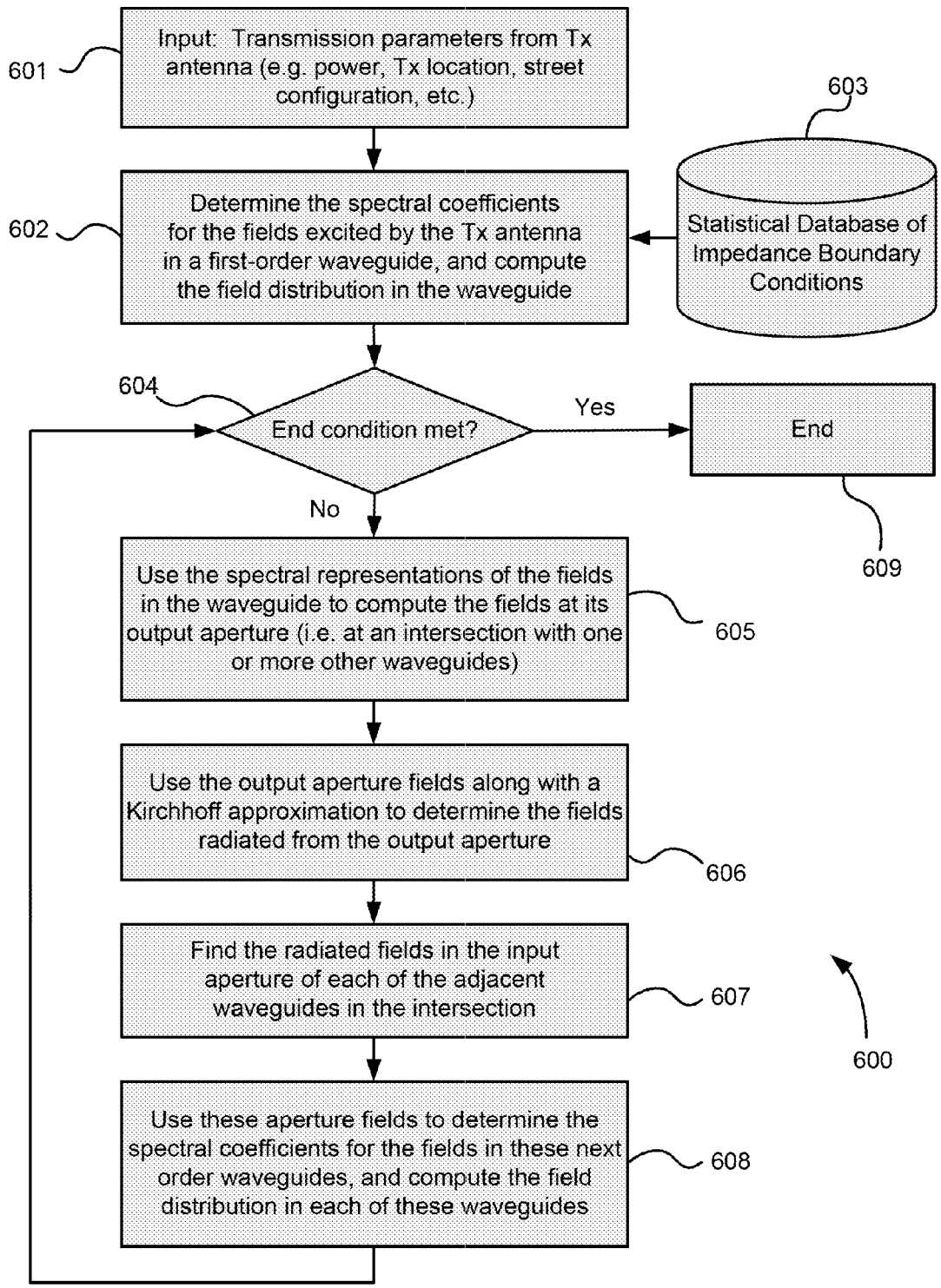
FIG. 6 is a schematic flow diagram of a second exemplary simulation method of the present invention where a transmission signal is propagated through a series of urban canyons until a predetermined end condition is met.

E. $2^{nd}$ Exemplary Embodiment of Signal Propagation Modeling Through the Network of Interconnected Urban Canyons FIG. 6 is a schematic flow diagram of a second exemplary simulation method of the present invention, generally indicated at reference character 600, where a transmission signal is propagated through a series of urban canyons until a predetermined end condition is met. As such, FIG. 6 is a second exemplary simulation method described by block 202 in FIG. 2 for calculating the modal fields in the propagation. As shown at block 601, transmission parameters from transmitter antenna (Tx), is received as input. Transmission parameters may include transmission location, power, building/street configuration information, i.e. map, etc. Block 603 shows the statistical database of impedance boundary conditions. At block 602, the transmission parameters from 601 and statistical impedance boundary conditions from the database 603 are used to determine the spectral coefficients for the fields excited by the Tx antenna. In particular, the transmission signal is propagated (i.e. propagation simulation) to find the modal-field solution for all waveguides included for modeling. At block 604, a determination is made as to whether a predetermined end condition is met, as previously discussed.

If the answer to block 604 is no, the simulation proceeds into adjacent waveguides as discussed above. In particular, at block 605 the fields are propagated down the waveguide to the next intersection and the spectral representations for the fields in the current waveguide are used to compute the fields at its output aperture, i.e., the aperture plane where the buildings end because of a crossing street or an alley between the buildings. Furthermore, modal fields in the waveguide itself are computed and preferably recorded for use in subsequent reporting/prediction of communications capability in that particular waveguide/zone. Since the waveguide is a closed structure, various mathematical means known in the art may be employed to analytically evaluate the inverse Fourier transform to find the fields. At block 606, the propagated fields are used along with Kirchhoff's approximation to determine the radiated fields, as previously discussed. At block 607, the radiated fields in the other apertures of the adjacent waveguides in the intersection are found. The previously discussed close-formed aperture radiation results are used to find the modal-fields in the input apertures for the adjacent waveguides in the intersection. Then at block 608, these radiated aperture fields are used to determine the spectral coefficients for the fields in the other waveguides. Once the input fields have been found for the adjacent waveguides in the intersection, then they can be used to solve for the spectral coefficients for the spectral-domain representations for the fields in these waveguides. Furthermore, as in claim 605 above, modal fields in the waveguide itself are computed and preferably recorded for use in subsequent reporting/prediction of communications capability in that particular waveguide/zone. This process is repeated at block 604 where a determination is made again whether an end condition is met. If so, the modeling ends at block 609.

F. Determining Statistical Parameters and Develop Real Time Parametric Propagation Model Using the Calculated Modal Fields After completing the propagation simulation of block 202 in FIG. 2, statistical parameter are next determined and real time close-formed parametric propagation model is developed at block 203 using the previously calculated modal fields of block 22. In particular, statistical parameters are first determined from the calculated modal fields. A simple real-time propagation channel model is then developed from the determined statistical parameters. Since it is well-known that wireless communications is a stochastic process, the propagation channel is modeled by statistical parameters such as expected value, variance, auto-correlation, covariance, different moments, etc. And since the equivalent impedance boundary conditions of the equivalent parallel-plate waveguide are random, the calculated modal fields consist of a coherent part and an incoherent part. The coherent part incorporates the expected value of the fields, while the incoherent part gives the field variance.

G. Using the Derived Close-Formed Parametric Propagation Model in Real Time Communications Prediction Applications The simple parametric model determined from the statistical parameters of the modal field calculations may be employed in various implementations, applications, formats, platforms, media, etc. known in the art, such as for example software, hardware, firmware, integrated circuits, FPGA etc., by which the communications predictions may be made for specific regions and zones in an urban environment. Applications which implement the model may include but are not limited to, for example: tactical simulation software, communications simulation software, strategic military planning software, standalone tools/devices to be carried into battlezones, commercial wireless planning software, etc. One example of a simple implementation of the parametric model as a prediction tool which simply receives input, such as transmission information, and outputs information related to, for example, urban zones capable of wireless communications, marginal communications capability, or no reception. In the alternative, information related to communications range or ranges may also be provided as output.

Figure 8:
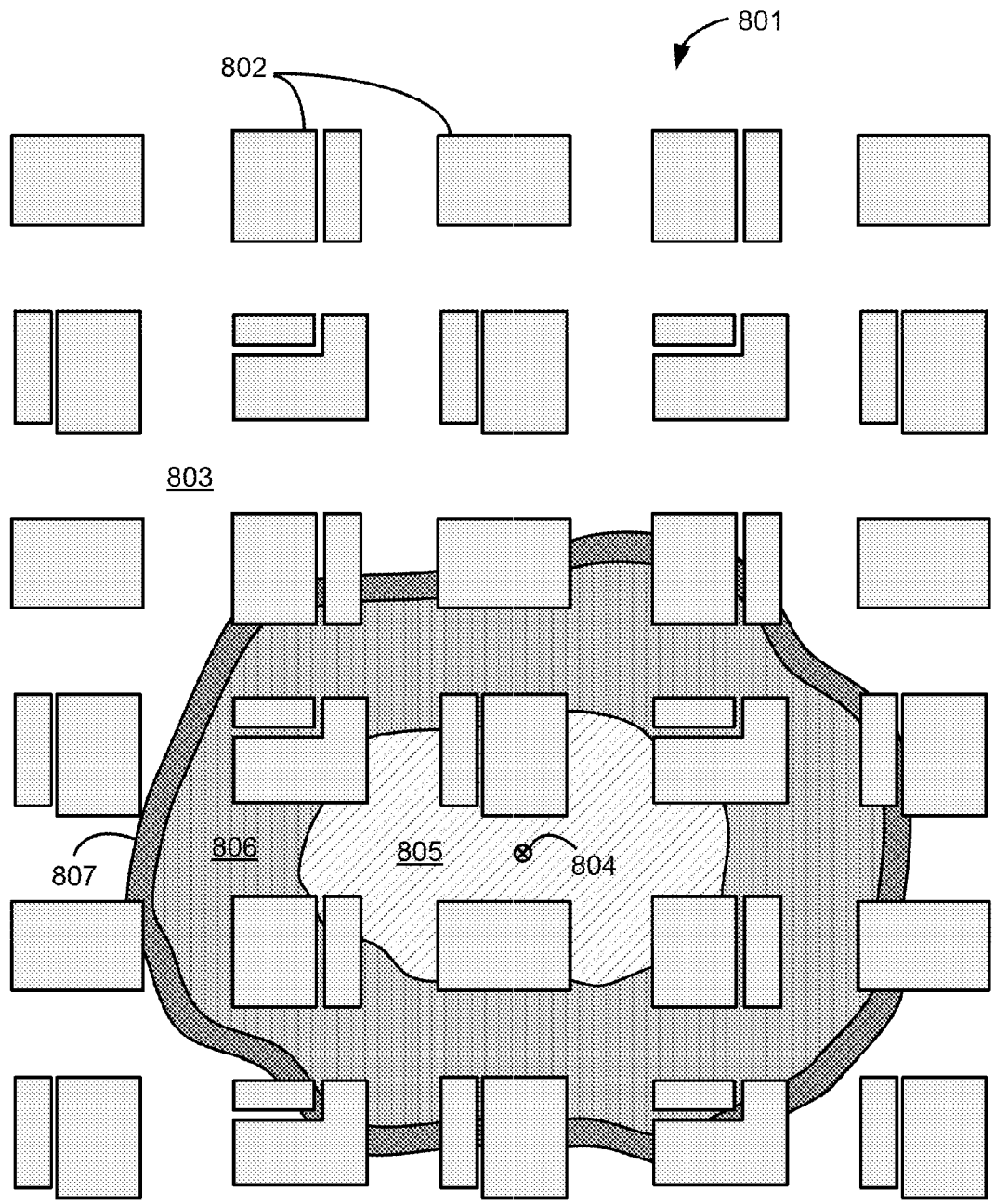
FIG. 8 is a plan view of visual output produced in an exemplary embodiment of the present invention, showing predictions of wireless communications capability and/or effectiveness from a transmission location in an urban environment.

An exemplary application and use of the parametric model and method of the present invention provides a graphic user interface (GUI) based statistical rapidly running model to accurately predict exterior radio communications in complex urban environments and provide the prediction in a graphic display format. FIG. 8 illustrates this concept, where various zones demarcating degrees of communications capability are graphically displayed. In particular, given a transmitter location at 804 in an urban environment 801 comprising a plurality of buildings such as 802 and a spatial network 803, three zones are calculated from parametric model and displayed. For example, zone 805 indicates areas of optimal communications ability, zone 805 indicating areas of sub-optimal communications ability, and zone 806 indicating marginal communications ability. Additionally, this functionality may be specifically provided as a compact handheld electronic map that rapidly and accurately displays dead/marginal zones in real time, such as for tactical RF communications based on a soldier's location in a complex urban environment.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:

1. A method of modeling electromagnetic wave propagation in an urban environment comprising a plurality of buildings and a spatial network therebetween, said method comprising:
   dividing the spatial network of the urban environment into a plurality of urban canyon waveguides clad by said buildings and interconnected to each other at intersections defined by waveguide apertures;
   propagating an electromagnetic wave through the urban environment to calculate spectral coefficients of modal fields in the waveguides excited by the propagation, wherein the calculation uses a database of statistical impedance boundary conditions of building walls;
   determining statistical parameters of the calculated modal fields; and
   determining a parametric propagation model based on the statistical parameters of the calculated modal fields.

2. The method of claim 1,
   wherein each of said urban canyon waveguides is characterized as having a uniform width and similar electrical properties.

3. The method of claim 1,
   wherein the statistical impedance boundary conditions in the database are based on equivalent impedance boundary conditions at reference planes.

4. The method of claim 3,
   wherein the equivalent impedance boundary conditions are constructed by taking the ratio of the tangential electric and tangential magnetic fields at the reference planes.

5. The method of claim 1,
   wherein the statistical impedance boundary conditions in the database represent different categories of buildings according to predetermined building façade parameters.

6. The method of claim 5,
   wherein the building façade parameters are based on at least one of material properties, geometrical locations, sizes and shapes, of said different categories of buildings.

7. The method of claim 1,
   wherein the calculation of spectral coefficients of modal fields in the waveguides excited by the propagation uses the modal field at an exit aperture of a first urban canyon waveguide to approximate the modal field at an entry aperture of a second adjacent urban canyon waveguide.

8. The method of claim 1,
   further comprising determining communications capability in different zones of the urban environment based on the parametric propagation model.

9. The method of claim 1,
   further comprising graphically displaying the communications capability in the different zones of the urban environment.

10. The method of claim 1,
    further comprising determining a maximum transmission range from a propagation location based on the parametric propagation model.

11. A method of determining communications capability in an urban environment comprising a plurality of buildings and a spatial network therebetween, said method comprising:
    receiving transmission parameters as input;
    simulating propagation of an electromagnetic wave through the urban environment based on said transmission parameters to calculate spectral coefficients of modal fields in the waveguides excited by the propagation, wherein the calculation uses a database of statistical impedance boundary conditions of building walls;
    determining statistical parameters of the calculated modal fields;
    determining a parametric propagation model based on the statistical parameters of the calculated modal fields; and
    determining communications capability in different zones of the urban environment based on the transmission parameters and the parametric propagation model.

* * * * *